Jan. 10, 1939.   C. H. KESTENMAN   2,143,703
CHAIN OR LINKAGE
Filed Dec. 30, 1937
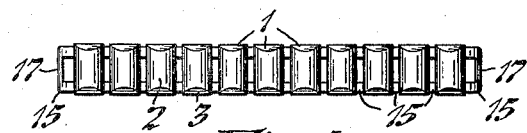
Fig. 1.
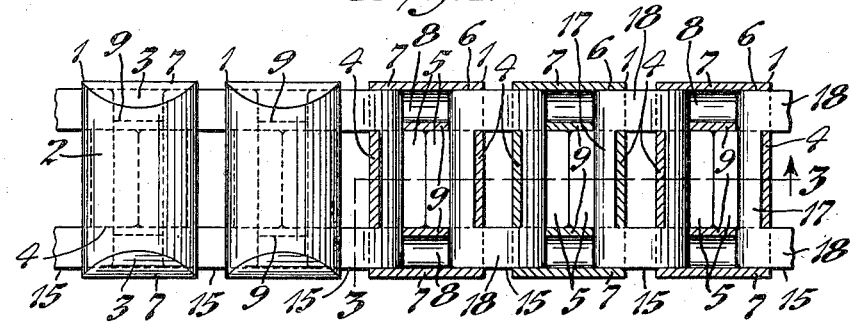
Fig. 2.
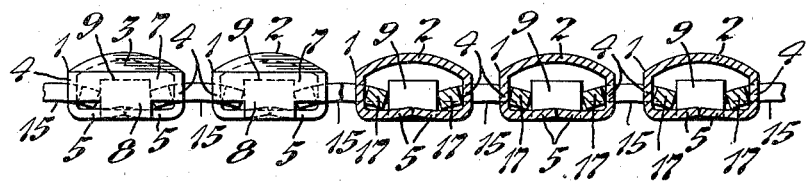
Fig. 3.
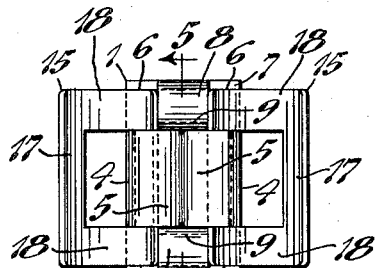
Fig. 4.
Fig. 5.
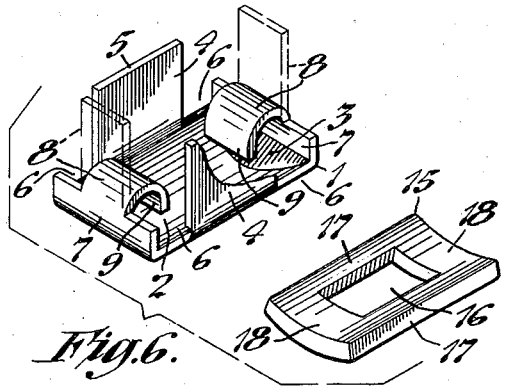
Fig. 6.
Fig. 7.
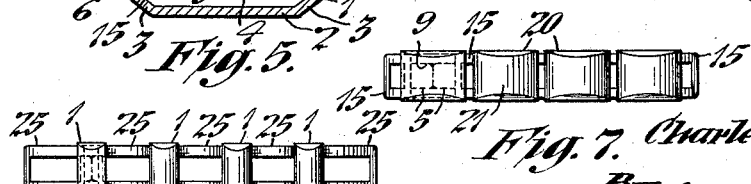
Fig. 8.
Inventor:
Charles H. Kestenman
By
Attorneys Patented Jan. 10, 1939

2,143,703

UNITED STATES PATENT OFFICE 2,143,703

CHAIN OR LINKAGE

Charles H. Kestenman, Providence, R. I., assignor to Kestenman Bros. Mfg. Co., Providence, R. I., a corporation of Rhode Island Application December 30, 1937, Serial No. 182,431

6 Claims. (Cl. 59—80)

The present invention relates to jewelry chains or linkages and particularly to an improved linkage embodying box-type links and adapted for use in watch-bracelets or for other purposes.

One of the objects of the present invention is to provide a chain or linkage embodying hollow box-links of novel one-piece construction.

Another object of the invention is to provide a chain or linkage comprising box-links connected to intermediate links and having means cooperating with the intermediate links to prevent relative sliding movement therebetween.

Another object of the invention is to provide a chain or linkage of articulated box-type links which is flexible throughout its length to adapt it to conform to the contour of the wrist when used as a bracelet but not subject to longitudinal contraction by relative movement of its links.

Still another object of the invention is to provide a chain or linkage of the type indicated which is of simple and compact construction, light in weight to save stock and one which is of symmetrical shape and ornamental in appearance.

Further objects of the improvement are set forth in the following specification which describes, by way of example, three forms of jewelry chains or linkages as illustrated by the accompanying drawing. In the drawing:

Fig. 1 is a plan view of a linkage embodying a series of the present improved box-links joined by looped connecting links to form a chain or bracelet;

Fig. 2 is an enlarged plan view of a part of the chain shown in Fig. 1 with several of the links illustrated partly in section to show the manner in which the box-type links are joined by the looped connecting links;

Fig. 3 is a side elevational view of the linkage shown part sectional on line 3—3 of Fig. 2 to illustrate the upstanding flanges on the box-links positioned between the bars of opposite connecting links to prevent relative sliding movement therebetween;

Fig. 4 is a bottom plan view showing one of the box-links with connecting links pivoted at its opposite sides and illustrating the closed bottom of the box-link;

Fig. 5 is a transverse sectional view on line 5—5 of Fig. 4 showing the relationship of the side and end flanges of the box-link;

Fig. 6 is a perspective view of the box-type link and its connecting link shown disassembled in inverted position with the box-link partly formed prior to being connected in a chain;

Fig. 7 is a top plan view of a modified form of chain or linkage embodying box-links of a different shape connected by intermediate links of the type illustrated in Figs. 1 to 6; and Fig. 8 is a top plan view of a modified form of chain or linkage having box-links of the type illustrated in Figs. 1 to 6 and elongated connecting links.

It is desirable in the jewelry art that the links of chains and bracelets be designed to give the appearance of weight and solidity while at the same time being of light, skeleton construction to save stock; especially when the links are made of precious metals. For this reason prevailing styles of bracelets and chains are constructed, at least in part, from hollow links and the present invention provides a box-type link of one-piece construction having the desired attributes while being capable of manufacture and assembly in tools without requiring hand work. In general, the improved link comprises a crowned top plate having flanges or wings at its sides folded downwardly and inwardly to form loops for connection with intermediate links, and flanges at its ends folded downwardly and curled upwardly between the bars of opposite connecting links to hold them in relatively fixed position with respect to the box-link.

Figs. 1 to 6 of the drawing illustrate a jewelry chain or linkage comprising alternate box-links 1 and looped connecting links 15. Each box-link 1 may be constructed from a single piece of sheet-metal blanked out and formed to provide a crowned top plate 2 having flatted beveled ends 3. Depending centrally from the opposite side edges of the crowned top plate 2 are wings or flanges of less width than the top plate forming side walls 4. The end portions 5 of the flanges project inwardly from the side walls 4 in spaced relation to the top wall 2 with their edges in abutting engagement to form a closed bottom wall. The side walls 4 and end portions 5 being centrally located on and of less width than the top plate 2 provide side openings 6 at the four corners of the box-link for a purpose as will later appear. Preferably, the abutting edges of the end portions 5 are dapped or arched upwardly as shown in Fig. 3 to prevent the edges from scratching or irritating the wrist of the wearer when the linkage is used as a bracelet.

Depending from the lateral edges of the top plate 2 of each box-link 1, that is, at the ends of the beveled portions 3, are folded flanges forming end walls 7 of substantially the same width as the side walls 4, the end walls and side walls thus being adapted to cooperate to provide a substantially hollow rectangular housing. Projecting downwardly from the end walls 7 are metal tabs 8 of less width than the side walls 4, the tabs being bent inwardly from the bottom edges of the side walls, see Figs. 5 and 6, and then curled upwardly adjacent the bottom of the top plate 2 to provide upstanding spacing members 9 within the interior of the hollow box-link. The inwardly-projecting portions of the tabs 8 cooperate with the inwardly-projecting end portions 5 of the sides 4 to close the bottom of the box-link 1 except for the openings 6 at its corners, see Fig. 4.

The connecting links 15 may be of any desired loop-like configuration, being preferably formed of sheet stock and generally curved or bowed to conform to the contour of the wrist of the wearer. Each of the connecting links 15 is provided with a central opening 16 to form a loop having rectangular side bars 17 with connecting webs 18 at their ends. The connecting links 15 are pivoted to the opposite sides of each of the box-links 1, one side bar 17 of each link 15 being positioned between the edges of the spacing members 9 and the inner face of the side wall 4 with its webs 18 extending outwardly through the corner openings 6. The connecting links 15 are thus looped to the side walls 4 of each box-link 1 and held in place by the inwardly-projecting ends 5 thereof; the parts being so dimensioned that the side walls 4 closely fit within the openings 16 in the connecting links and the webs 18 of the connecting links closely fit within the corner openings 6. It will be understood that the webs 18 of each of the connecting links 15 project outwardly through the corner openings 6 at one side of the box-link 1 and the opposite side bar 17 is positioned between the edges of the spacing members 9 and side wall 4 of the next adjacent box-link 1. Thus, each connecting link 15 is adapted to pivot on either of the adjacent box-links 1 to which it is connected, but is prevented from sliding movement with respect to the box-links 1 by the close fit of its side bars 17 between the edges of the spacing members 9 and the side walls 4.

In the preferred method of assembling the links of the chain or linkage the box-links 1 are placed in inverted position with the end portions 5 of the side walls 4 projecting upwardly as indicated in Fig. 6 prior to their being folded inwardly. The opposite side bars 17 of the several connecting links 15 are then hooked over the upstanding side walls 4 of adjacent box-links. Preferably, the end flanges of the box-links 1 are folded over to form the end walls 7 and the tabs 8 are curled inwardly and toward the top wall 2 as illustrated in Fig. 6 before the connecting links 15 are applied to the box-links so that when the links 15 are connected therewith their side bars 17 will be positioned between the edges of the spacing members 9 and the side walls 4. After the connecting links 15 have been connected to adjacent box-links 1 the end portions 5 of the side walls 4 are folded inwardly. The box-links 1 are thus formed as a complete closure as illustrated in Fig. 3 to retain the bars 17 of the connecting links 15 in fixed position therein with the upwardly-extending spacing members 9 positioned between the opposite bars 17 of adjacent connecting links 15 to hold the latter in spaced relationship. The clearance between the side bars 17 of the connecting links 15 and the spacing members 9 and side walls 4 is made as close as possible to prevent sliding movement between the box-links 1 and connecting links 15, while at the same time permitting pivotal movement between the links to provide an articulated structure. The forming of the blanks for the box-links 1 and the folding of their side and end flanges may be accomplished automatically by means of suitable blanking and forming dies, thus eliminating hand work and rendering the manufacturing operation more rapid and economical.

In its completed form the linkage appears to have weight and solidity, the box-links 1 comprising closed arched tops 2, closed bottoms, and closed sides 4 and ends 7 due to the adjacent relationship of the side and end flanges. As will be observed by reference to the showing in Fig. 1 of the drawing, the box-links 1 give a symmetrical and ornamental appearance to the complete assembly with the several links pivotally connected throughout the length of the chain and the box-links maintained in spaced relationship at all times due to the provision of the spacing members 9. In other words, the links are prevented from sliding on each other to disrupt the symmetry of the chain.

Fig. 7 illustrates a modified form of jewelry chain or linkage comprising a box-link 20 of somewhat different shape joined by connecting links 15 of the type illustrated in Figs. 1 to 6. In this modified form of linkage the box-links 20 have crown portions 21 of greater length than width to provide a relatively narrow chain or bracelet as compared with the linkage illustrated in Fig. 1. Otherwise, the box-links are substantially identical with those illustrated in Figs. 1 to 6 and have the same form of side and end flanges which are folded in the same manner to provide a closed construction.

Another modified form of linkage is illustrated in Fig. 8 as comprising box-links identical with those shown in Figs. 1 to 6, but joined by connecting links 25 of a different shape. The connecting links 25 in this embodiment of the invention are of the same looped form as illustrated in Figs. 1 to 5, but the connecting webs 26 are of greater length so as to hold the box-links a substantial distance apart. In this form of linkage, as in the forms first described, the box-links are of closed construction on all sides and act to hold the connecting links in spaced relationship to prevent contraction of the chain or bracelet.

While the invention is herein shown as embodied in three preferred forms of chain or linkage construction, it is to be understood that various other modifications may be made in the structure and arrangement of the parts of the linkage without departing from the spirit or scope of the invention. Therefore, without limiting myself in this respect, I claim:

1. A hollow link of one-piece construction having a top wall, flanges at the sides of the top wall folded downwardly and then inwardly in spaced relation to the top wall to form a bottom wall, and flanges at the ends of the top wall bent downwardly, inwardly and upwardly.

2. A hollow link of one-piece construction comprising a top wall, flanges at the sides of the top wall of less width than the top wall and folded downwardly and then inwardly with their ends in abutting engagement to form a bottom wall, and flanges at the ends of the top wall bent downwardly, inwardly and upwardly adjacent the opposite edges of the bottom wall.

3. A box-link of one-piece construction comprising a crowned top wall, central flanges at the sides of the top wall folded downwardly and then inwardly with their ends in abutting engagement to form a bottom wall, end walls depending from the top wall, and tabs projecting centrally from the end walls and bent inwardly and upwardly adjacent the edges of the side flanges to provide spacing members within the box-link.

4. In a chain or linkage of the type indicated, the combination of hollow box-links joined by looped connecting links at their opposite sides, and spacing members within the box-links extending at right-angles to the sides with their edges engaging the opposite connecting links to prevent contraction of the linkage.

5. In a chain or linkage of the type indicated, the combination of a box-link having flanges at its sides folded downwardly and then inwardly, looped connecting links at the opposite sides of the box-link hooked to the side flanges on the box-link, and means in the box-link engaging the opposite connecting links to hold them against sliding movement with respect to the box-link.

6. In a chain or linkage of the type indicated, the combination of a box-link having a top wall with flanges at its sides folded downwardly and then inwardly, end flanges depending from the top wall of the box-link and having tabs of lesser width bent inwardly and upwardly, and connecting links at the opposite sides of the box-link having side bars looped around the side flanges of the box-link and closely fitting between the upstanding edges of the tabs and said side flanges, said connecting links being adapted to pivot on the box-link while held against sliding movement relatively thereto by the tabs and the side flanges of the box-link.

CHARLES H. KESTENMAN.